(12) United States Patent
Jung et al.

(10) Patent No.: US 12,362,625 B2
(45) Date of Patent: Jul. 15, 2025

(54) BRUSHLESS DIRECT CURRENT BLOWER MOTOR WITH NOVEL MOTOR COVER

(71) Applicant: Hyoseong Electric, Co., Ltd., Busan (KR)

(72) Inventors: Jin Gun Jung, Busan (KR); Chi Won Moon, Busan (KR); Seokmin Kim, Busan (KR)

(73) Assignee: Hyoseong Electric, Co., Ltd., Busan (KR)

( * ) Notice: Subject to any disclaimer, the term of this patent is extended or adjusted under 35 U.S.C. 154(b) by 3 days.

(21) Appl. No.: 18/617,875

(22) Filed: Mar. 27, 2024

(65) Prior Publication Data

US 2024/0333072 A1    Oct. 3, 2024

(30) Foreign Application Priority Data

Mar. 29, 2023   (KR) .................. 10-2023-0041345

(51) Int. Cl.
| | |
|---|---|
| *H02K 1/18* | (2006.01) |
| *H02K 5/10* | (2006.01) |
| *H02K 5/22* | (2006.01) |
| *H02K 5/24* | (2006.01) |

(52) U.S. Cl.
CPC .................. *H02K 5/10* (2013.01); *H02K 5/24* (2013.01); *H02K 1/187* (2013.01); *H02K 5/225* (2013.01); *H02K 2203/03* (2013.01)

(58) Field of Classification Search
CPC ....... H02K 1/187; H02K 1/2786–2789; H02K 1/279; H02K 1/2791; H02K 1/27915; H02K 1/2792; H02K 5/10; H02K 5/22; H02K 5/225; H02K 5/24; H02K 21/22
See application file for complete search history.

(56) References Cited

FOREIGN PATENT DOCUMENTS

| | | | |
|---|---|---|---|
| CN | 108400682 A | 8/2018 | |
| CN | 109494912 A | 3/2019 | |
| EP | 3674557 A1 * | 7/2020 | ............... H02K 1/12 |
| JP | 2012231579 A * | 11/2012 | |
| KR | 20-2009-0005727 U | 6/2009 | |
| KR | 10-2018-0049504 A | 5/2018 | |
| KR | 10-2019-0012501 A | 2/2019 | |
| KR | 10-2020-0007145 A | 1/2020 | |
| KR | 10-2020-0079437 A | 7/2020 | |
| KR | 10-2183072 B1 | 11/2020 | |

OTHER PUBLICATIONS

ITO, Machine Translation of JP2012231579, Nov. 2012 (Year: 2012).*

* cited by examiner

*Primary Examiner* — Eric Johnson
(74) *Attorney, Agent, or Firm* — Revolution IP, PLLC

(57) ABSTRACT

A blower motor includes a motor assembly 100 including a stator assembly 1 comprising a stator core 10, an upper insulator 11 coupled to an upper portion of the stator core 10 and a lower insulator 12 coupled to a lower portion of the stator core 10, a rotor assembly 2 rotating around the stator assembly 1, a stator block 3 to which the stator assembly 1 is coupled, a printed circuit board 4 located at a lower portion of the stator block 3, and a motor cover 5 coupled to the stator block 3; a flange 200; and a damper plate 300.

5 Claims, 7 Drawing Sheets

BRUSHLESS DIRECT CURRENT BLOWER MOTOR WITH NOVEL MOTOR COVER

BACKGROUND OF THE INVENTION

Technical Field

The present invention relates to a blower motor used in an air conditioning system for a vehicle, etc. More specifically, the present invention relates to a blower motor applying a motor cover with a novel structure, thereby reducing vibration generated during operation of the motor and blocking noise.

Background Art

In general, vehicles need to introduce hot or cool air thereinto to control the temperature or humidity inside the vehicles, and the air for controlling the temperature and humidity is circulated by rotation of a blower fan. The blower fan is driven by a blower motor.

The blower motor includes a rotor, a stator and a housing accommodating the stator and the rotor. When current is applied to a coil wound around the stator core, the rotor is rotated by electromagnetic interaction with the stator, thereby rotating a fan assembly installed in a rotating shaft of the rotor, to perform air conditioning.

When such blower motors are used in an environment such as an air conditioning system for a vehicle, condensation or moisture generated due to temperature differences may penetrate into the inside of the motor and cause failure of electrical components such as printed circuit boards. Thus, it is important to have a structure for preventing moisture penetration. In addition, it is necessary to prevent noise generated during operation of the motor and noise caused by the air flow generated during operation of the blower fan.

Korean Patent Laid-Open No. 10-2020-0079437 discloses a blower motor with a structure in which a motor cover is mounted in a state where the components of the blower motor are secured to a flange. This prior art does not mention preventing moisture from penetrating into the inside of the motor cover and adversely affecting the electrical components inside the motor.

Korean Utility Model Laid-Open No. 20-2009-0005727 discloses a structure in which an anti-vibration member is installed in a motor housing to prevent vibration when coupling the motor housing to a flange. According to this prior art, in the case of coupling the blower motor to the flange, when air generated from a fan is introduced between the blower motor and the flange, air may leak out through a small gap between the blower motor and the flange, causing noise. In addition, since the housing of the blower motor and the inner surface of the flange are fit being in contact with each other, vibration generated during operation of the blower motor is still transmitted to the flange and the portion where the flange is installed.

Accordingly, the present invention suggests a blower motor having a motor cover with a novel structure capable of protecting moisture-susceptible parts including the printed circuit board of the blower motor and effectively preventing noise and vibration generated during operation of the motor.

SUMMARY OF THE INVENTION

Task to be Solved

It is an object of the present invention to provide a blower motor capable of effectively preventing moisture from penetrating into the inside of the blower motor.

It is another object of the present invention to provide a blower motor with a structure capable of preventing air leakage occurring between the blower motor and the flange.

It is yet another object of the present invention to provide a blower motor capable of effectively preventing noise and vibration generated during operation of the blower motor and the fan.

The above and other inherent objects of the present invention may all be easily achieved by the description of the present invention described below.

Means for Solving Task

The blower motor according to the present invention comprises a motor assembly 100 comprising a stator assembly 1 comprising a stator core 10, an upper insulator 11 coupled to an upper portion of the stator core 10 and a lower insulator 12 coupled to a lower portion of the stator core 10; a rotor assembly 2 rotating around the stator assembly 1; a stator block 3 to which the stator assembly 1 is coupled; a printed circuit board 4 located at a lower portion of the stator block 3; and a motor cover 5 coupled to the stator block 3; a flange 200 comprising a flange body 201 having a hole in the center into which the motor assembly 100 is inserted, an upper protrusion 202 having an annular shape protruding upwardly along a periphery of the hole into which the motor assembly 100 is inserted, a damper seating part 203 formed in the shape of a groove on an inner side of the hole of the motor assembly 100, and a plurality of coupling protrusions 204 formed in the shape of protrusions on a lower portion of the flange body 201; and a damper plate 300 comprising an annular body 301 having a ring shape, a plurality of locking parts 302 protruding upwardly from a periphery of the annular body 301 at regular intervals, and a plurality of protrusion guides 303 protruding toward the shaft 21 from a periphery of the annular body 301 at regular intervals, wherein the motor cover 5 comprises a cover part 50 and a packing part 51 enclosing a periphery of the cover part 50.

In the present invention, the cover part 50 having a cup shape in which an upper portion is open may comprise a cover body 500; a connector coupling part 501 having a shape in which a portion of one side of the cover body 500 is open, to which a connector 41 is coupled; a rim part 502 having a shape extending outwardly along an upper edge of the cover body 500; a plurality of pairs of decoupling parts 503 protruding upwardly from a periphery of the rim part 502 at regular intervals; and a plurality of PCB coupling parts 504 formed in the shape of a groove on an inner side of an upper surface 502A of the rim part 502 at regular intervals.

In the present invention, the cover part 50 may further comprise a central protrusion 505 protruding upwardly from the center of an inner side of the cover body 500, and a central groove 506 formed by being indented upwardly from the center of an outer side of the cover body 500.

In the present invention, the packing part 51 may comprise a connector sealing part 511 formed around the connector coupling part 501; a water sealing part 512 formed on an upper surface 502A of the rim part 502; a decoupling damper part 513 formed to enclose a decoupling part 530 protruding upwardly from an outer side of the rim part 502; a PCB support part 514 covering the PCB coupling part 504; and an air sealing part 515 formed to cover a side surface 502B and a lower surface 502C of the rim part 502 of the cover body 500.

In the present invention, the water sealing part 512 may seal the gap between the upper surface 502A of the rim part 502 and the plate 30 of the stator block 3.

In the present invention, the decoupling damper part 513 may be seated on the damper seating part 203 of the flange 200.

In the present invention, the air sealing part 515 may be pressed against a protrusion guide 303 of the damper plate 300 supporting a portion between the decoupling parts 503.

Effect of Invention

The present invention has an effect of providing a blower motor capable of effectively preventing moisture from penetrating into the inside of the blower motor, preventing air leakage occurring between the blower motor and the flange, and effectively preventing noise and vibration generated during operation of the motor and the fan.

Hereinafter, the present invention will be described in detail with reference to the accompanying drawings.

DETAILED DESCRIPTION OF THE INVENTION

Figure 1:
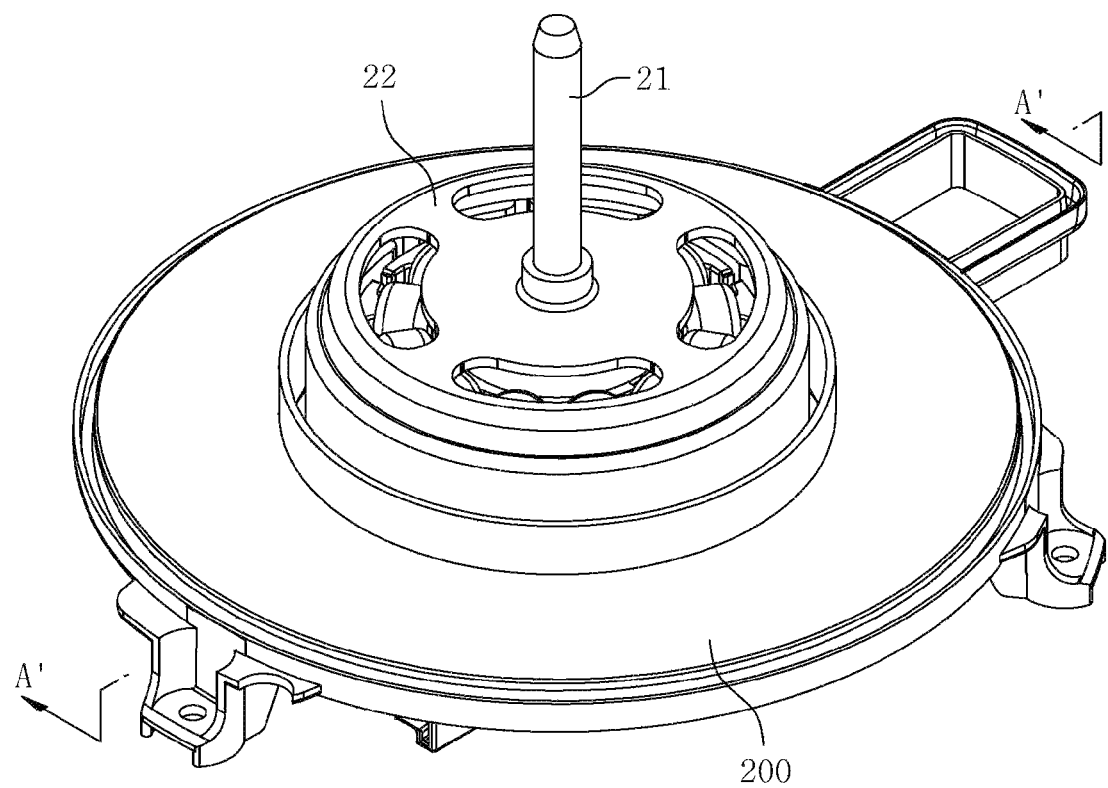
FIG. 1 is a perspective view of a blower motor according to the present invention.
Figure 2:
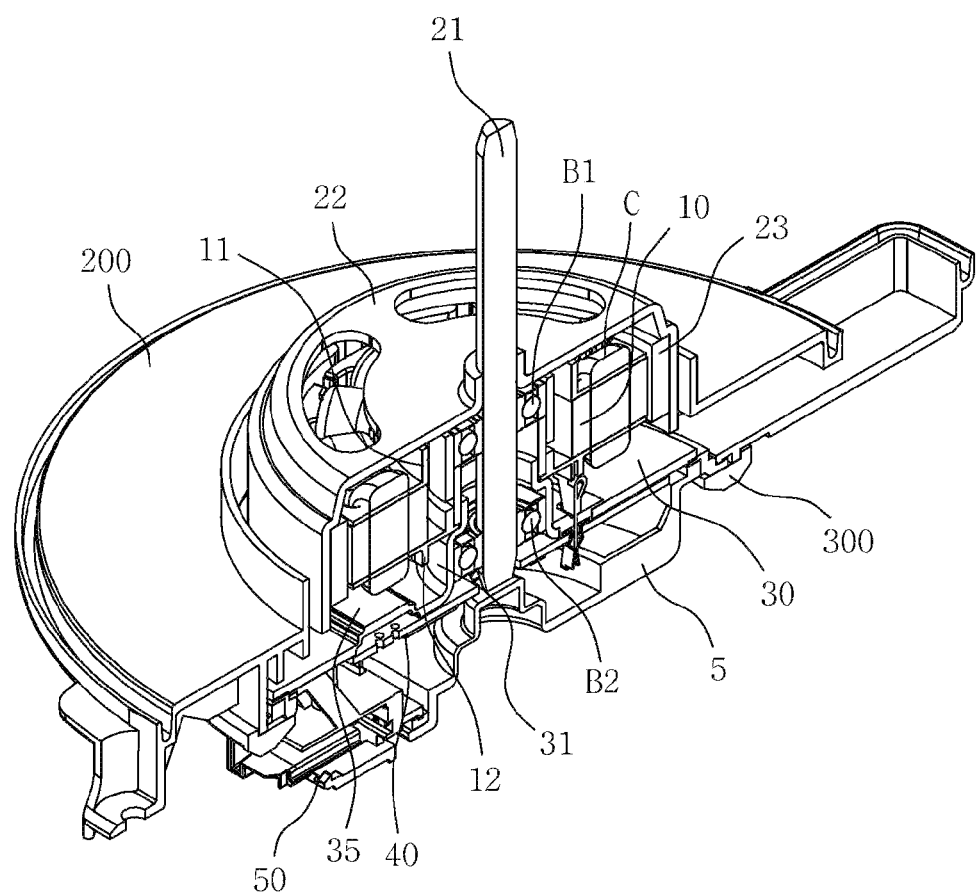
FIG. 2 is a cut-away perspective view of the blower motor in FIG. 1 taken along line A-A'.
Figure 3:
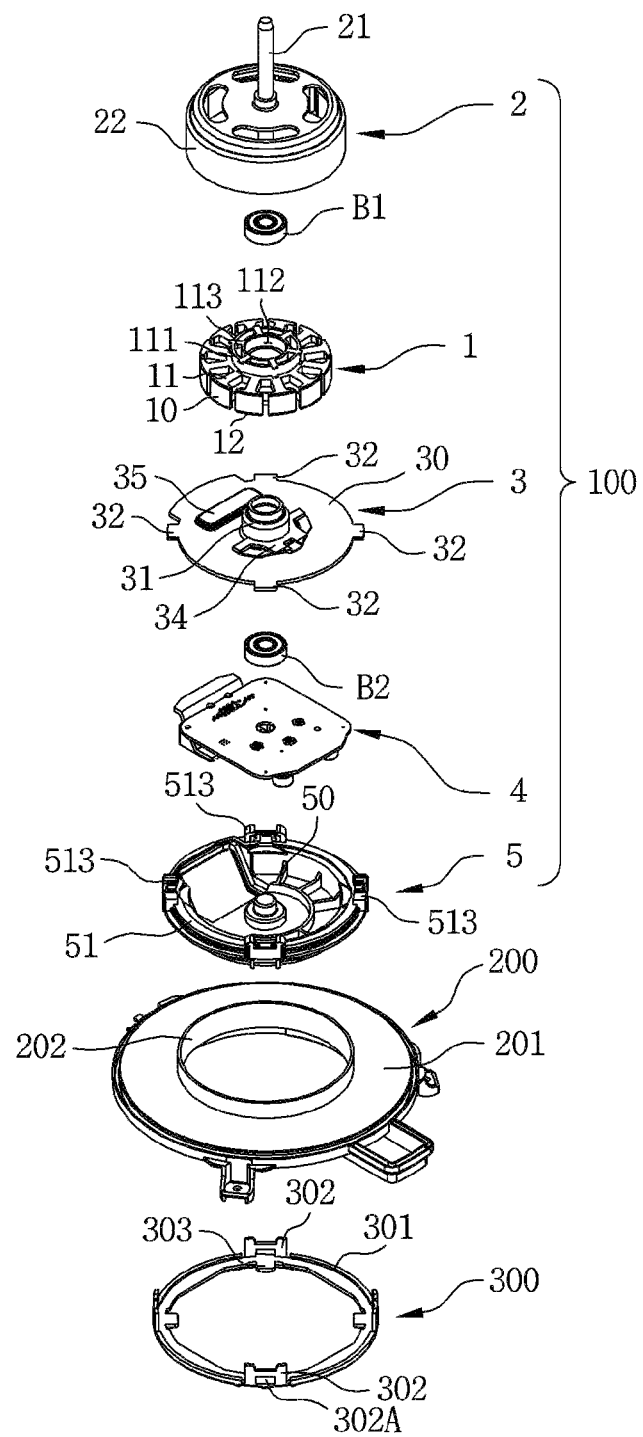
FIG. 3 is an exploded perspective view of a blower motor according to the present invention.
Figure 4:
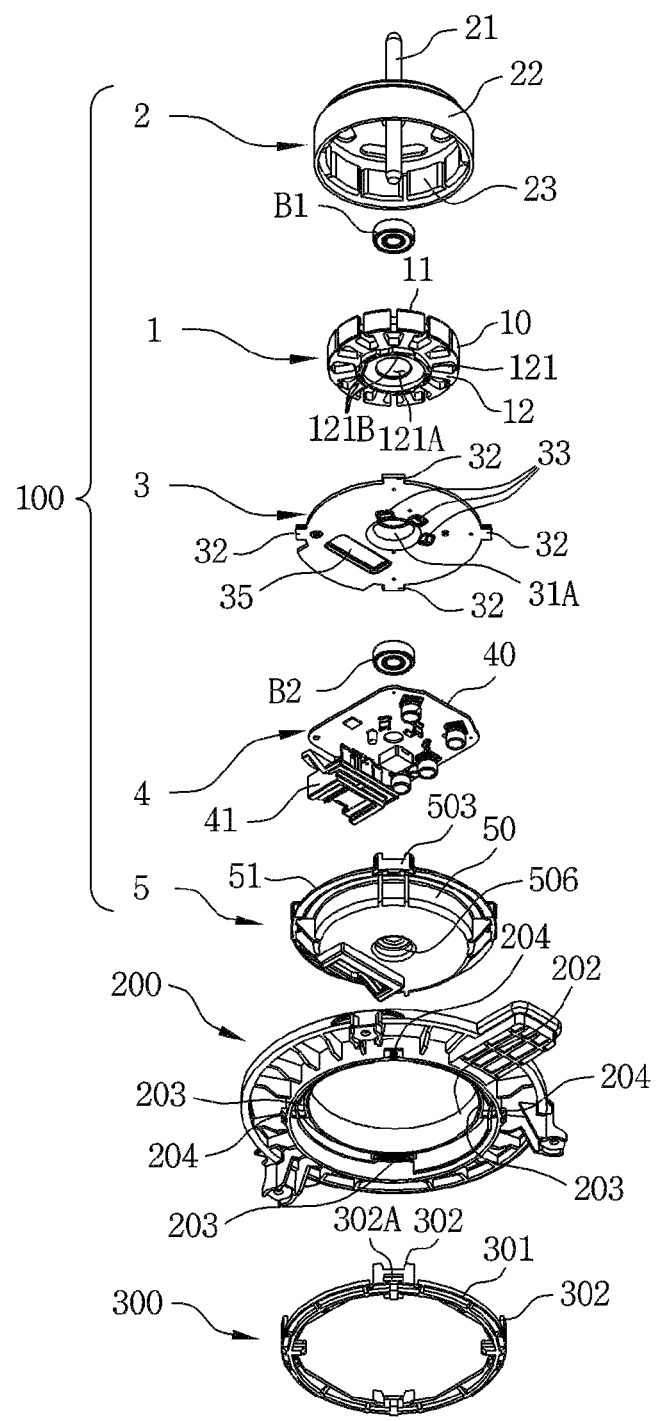
FIG. 4 is a bottom exploded perspective view of a blower motor according to the present invention.

FIG. 1 is a perspective view of a blower motor according to the present invention. FIG. 2 is a cut-away perspective view of the blower motor in FIG. 1 taken along line A-A'. FIG. 3 is an exploded perspective view of a blower motor according to the present invention. FIG. 4 is a bottom exploded perspective view of a blower motor according to the present invention.

As illustrated in FIGS. 1 to 4, the blower motor according to the present invention comprises a motor assembly 100, a flange 200 and a damper plate 300.

The motor assembly 100 comprises a stator assembly 1, a rotor assembly 2, a stator block 3, a printed circuit board 4, and a motor cover 5. The motor assembly 100 is seated on the flange 200, and the damper plate 300 is coupled to the flange 200 to prevent the motor assembly 100 from dislodging.

The stator assembly 1 of the present invention comprises a stator core 10, an upper insulator 11 and a lower insulator 12. The upper insulator 11 is coupled to an upper portion of the stator core 10, and the lower insulator 12 is coupled to a lower portion of the stator core 10. The upper insulator 11 comprises an upper protrusion 111 protruding upwardly from the center, an upper central space 112 formed inside the upper protrusion 111 to be coupled to an upper bearing B1, and a plurality of flow passages 113 formed axially around the upper central space 112.

The lower insulator 12 comprises a lower protrusion 121 protruding downwardly from the center. The lower protrusion 121 comprises a lower central space 121A for coupling a hollow protrusion 31 of the stator block 3, and a plurality of terminal grooves 121B for installing terminals (not illustrated). A coil (not illustrated) is wound around the stator assembly 1 according to a predetermined pattern. An end of the wound coil is electrically connected to the terminal protruding downwardly from the lower insulator 12.

The rotor assembly 2 comprises a shaft 21, a rotor housing 22 having a cup shape with a lower portion open, to which the shaft 21 is coupled and which rotates with the shaft 21, and a plurality of magnets 23 attached along an inner wall of the rotor housing 22 at regular intervals. The rotor assembly 2 is installed to enclose the stator assembly 1, and is rotated by a changing magnetic field generated by the stator assembly 1. The shaft 21 is rotatably supported by an upper bearing B1 and a lower bearing B2. The upper bearing B1 is installed in an upper central space 112 of the upper insulator 11. The lower bearing B2 is installed in an inner space 31A in the center of the stator block 3.

The stator assembly 1 is coupled to an upper portion of the stator block 3, and the printed circuit board 4 is located at a lower portion of the stator block 3. The stator block 3 comprises a plate 30 having a circular shape, a hollow protrusion 31 protruding upwardly from a central portion of the plate 30, a protruding coupler 32 protruding radially from a periphery of the plate 30 at regular intervals, a through hole 33 formed through vertically around the hollow protrusion 31 of the plate 30, through which terminals passes, an insulating member 34 for closing the through hole 33, and a device groove 35 for receiving a portion in which some devices mounted on the printed circuit board 4 protrude. Preferably, the plate 30 is made of aluminum, which has high electrical and thermal conductivity.

The stator assembly 1 is coupled to the hollow protrusion 31 of the stator block 3. The lower bearing B2 rotatably supporting the shaft 21 is coupled to the inner space 31A inside the hollow protrusion 31.

The printed circuit board 4 comprises a substrate 40 on which various devices are mounted, and a connector 41 installed on one side of the substrate 40 to be connected to an external power source. The terminals passing through the plate 30 are electrically connected to the substrate 40. The circuits on the substrate 40 are physically and electrically connected to the plate 30 of the stator block 3, which allows the circuits to be grounded.

The motor cover 5 comprises a cover part 50 and a packing part 51, and the stator block 3 and the printed circuit board 4 are coupled to an upper portion of the motor cover 5. The detailed features of the motor cover 5 will be described again in the following.

The flange 200 comprises a flange body 201 having a hole in the center, into which the motor assembly 100 is inserted, an upper protrusion 202 having an annular shape protruding upwardly along a periphery of the hole into which the motor assembly 100 is inserted, a damper seating part 203 formed in the shape a groove at a position corresponding to a decoupling damper part 513 of the motor assembly 100, and a coupling protrusion 204 formed in the shape of a protrusion on a lower portion of the flange body 201 at a position corresponding to a locking part 302 of the damper plate 300.

A portion of the rotor assembly 2 is located inside the upper protrusion 202 to rotate. The decoupling damper part 513 of the motor cover 5 is seated on the damper seating part 203 having a groove shape.

The damper plate 300 has an annular body 301 having a ring shape, a plurality of locking parts 302 protruding upwardly from a periphery of the annular body 301 at regular intervals, and a plurality of protrusion guides 303 protruding toward the shaft 21 from a periphery of the annular body 301 at regular intervals. The locking part 302 has a locking hole 302A, and the locking hole 302A is coupled to the coupling protrusion 204. The locking hole 302A may be modified to have a protrusion shape, and the coupling protrusion 204 may be modified to have a hole or groove shape. The protrusion guide 303 supports the motor cover 5 to prevent the motor assembly 100 from dislodging downwardly.

Figure 5:
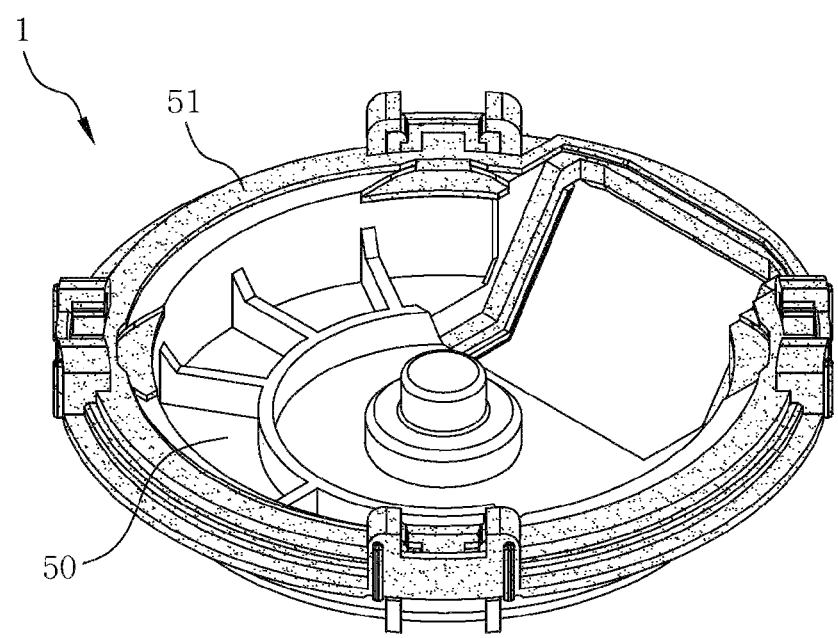
FIG. 5 is a perspective view of a motor cover of a blower motor according to the present invention.
Figure 6:
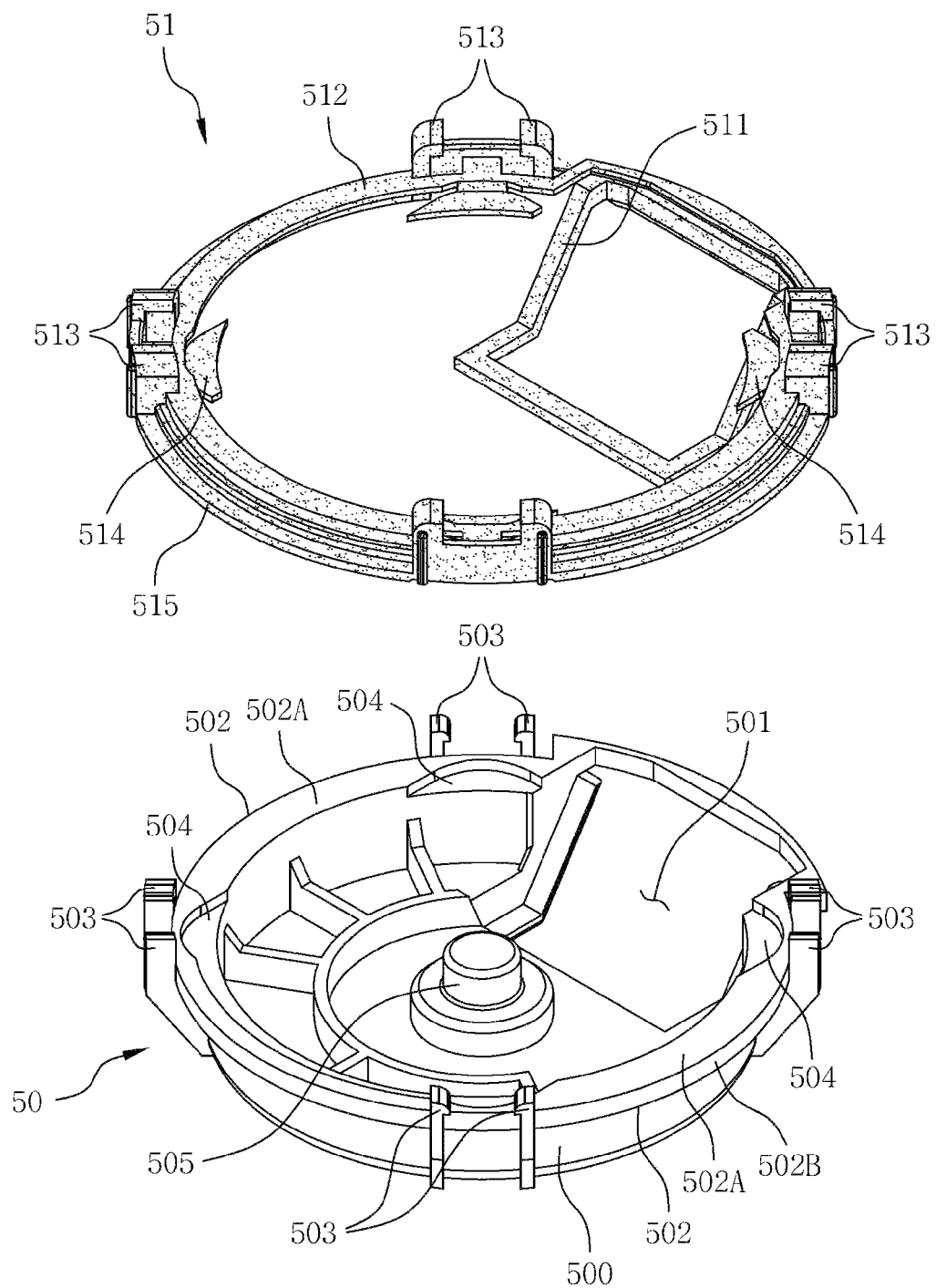
FIG. 6 is an exploded perspective view of a motor cover of a blower motor according to the present invention.
Figure 7:
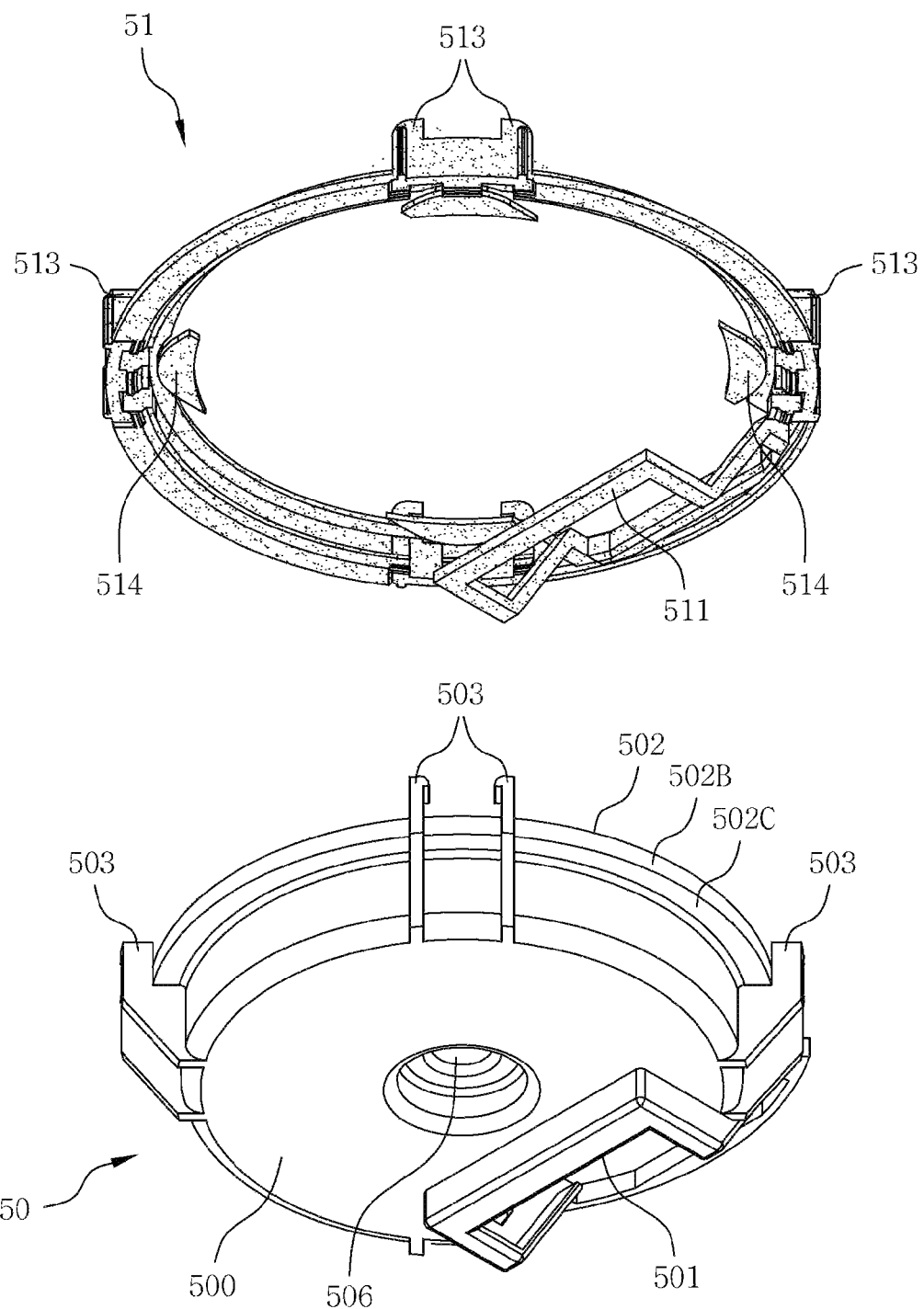
FIG. 7 is a bottom exploded perspective view of a motor cover of a blower motor according to the present invention.

FIG. 5 is a perspective view of a motor cover 5 of a blower motor according to the present invention. FIG. 6 is an exploded perspective view of a motor cover 5 of a blower motor according to the present invention. FIG. 7 is a bottom exploded perspective view of a motor cover 5 of a blower motor according to the present invention.

As illustrated in FIGS. 5 to 7, the motor cover 5 of the present invention comprises a cover part 50 and a packing part 51. The cover part 50 is formed from a plastic resin injection molded material, and the packing part 51 is made of a material such as rubber, etc. to provide a sealing and buffering function while enclosing a periphery of the cover part 50. In order to form the packing part 51 on the cover part 50, a multiple injection molding method in which the cover part 50 is placed in an injection mold and subjected to several steps of injection using rubber may be applied.

The cover part 50 comprises a cover body 500, a connector coupling part 501, a rim part 502, a decoupling part 503, a PCB coupling part 504, a central protrusion 505 and a central groove 506. The cover body 500 has a cup shape in which an upper portion is open. The connector coupling part 501 has a shape in which a portion of one side of the cover body 500 is open, to which a connector 41 is coupled.

The rim part 502 has a flange shape extending outwardly along an upper edge of the cover body 50. A plurality of pairs of decoupling parts 503 protrude upwardly from a periphery of the rim part 502 at regular intervals. FIG. 6 illustrates four pairs of decoupling parts 503 spaced 90 degrees apart, but the number of pairs is not necessarily limited thereto.

A plurality of PCB coupling parts 504 are formed in the shape of a groove on an inner side of an upper surface 502A of the rim part 502 at regular intervals. FIG. 6 illustrates four PCB coupling parts 504 spaced 90 degrees apart, but the number of PCB coupling parts is not necessarily limited thereto.

The central protrusion 505 protrudes upwardly from the center of an inner side of the cover body 500, and an upper surface of the central protrusion 505 supports a lower end of the shaft 21 when the shaft 21 is coupled to the rotor housing 22. At this time, since a lower end of the shaft 21 exerts a force pressing the central protrusion 505, a protrusion of the jig is inserted into the central groove 506 which is opposite the central protrusion 505 to support the central protrusion 505. The central groove 506 has a shape being indented upwardly from the center of an outer side of the cover body 500.

The packing part 51 comprises a connector sealing part 511, a water sealing part 512, a decoupling damper part 513, a PCB support part 514, and an air sealing part 515, which are preferably connected as a single member. As described above, the packing part 51 has a structure coupled to a periphery of the cover body 500 of the cover part 50, and the packing part 51 may be made of a rubber material by multiple injection molding on the cover part 50.

The connector sealing part 511 is formed around the connector coupling part 501. The water sealing part 512 is formed on the upper surface 502A of the rim part 502. The substrate 40 of the printed circuit board 4 is located in an inner space of the cover body 500, and the connector 41 mounted on the substrate 40 is coupled to the connector coupling part 501. The connector sealing part 511 is formed around the connector coupling part 501 to seal the gap between the connector 41 and the connector coupling part 501.

The water sealing part 512 seals the gap between the upper surface 502A of the rim part 502 and the plate 30 of the stator block 3, thereby preventing moisture from penetrating into the inside of the cover body 500 from the outside.

The decoupling damper part 513 is formed to enclose the decoupling part 503 protruding upwardly from an outer side of the rim part 502 of the cover part 50. The decoupling damper part 513 is seated on the damper seating part 203 of the flange 200 to form a decoupling structure between the motor assembly 100 and the flange 200. Accordingly, the vibration generated when the motor assembly 100 is operated may be absorbed by the decoupling damper part 513 to reduce the vibration.

The PCB support part 514 has a shape covering the PCB coupling part 504 formed on an upper part of the cover body 500. When the substrate 40 is coupled to the PCB coupling part 504, the substrate 40 is buffered and supported by the PCB support part 514, and accordingly noise generated from the coupling portion during operation of the motor may be prevented.

The air sealing part 515 is formed to cover a side surface 502B and a lower surface 502C of the rim part 502 of the cover body 500. When the damper plate 300 is coupled in a state where the motor assembly 100 is seated on the flange 200, the damper plate 300 is in contact with the lower surface 502C of the rim part 502 of the cover body 500. In addition, a portion of the lower surface 502C, in particular, a portion between the decoupling parts 503, is supported by the protrusion guide 303 of the damper plate 300 against which the air sealing part 515 is pressed, thereby providing both the decoupling function described above and the air leakage preventing function. In other words, by allowing the air sealing part 515 to be pressedly coupled between the lower surface 502C and the damper plate 300, the flow of air generated by operation of the blower fan is prevented from being introduced between the motor assembly 100 and the flange 200, or between the motor assembly 100 and the damper plate 300. Thus, noise generated by the flow of air may be prevented.

It should be noted that the description of the present invention described above is merely an example for understanding the present invention, and is not intended to limit the scope of the present invention. It should be construed that the scope of the present invention is defined by the appended claims, and all modifications and alternations of the present invention fall within the protection scope of the present invention.

The invention claimed is:
1. A blower motor, comprising:
   a motor assembly (100) comprising a stator assembly (1) comprising a stator core (10), an upper insulator (11) coupled to an upper portion of the stator core (10) and a lower insulator (12) coupled to a lower portion of the stator core (10), a rotor assembly (2) rotating around the stator assembly (1), a stator block (3) to which the stator assembly (1) is coupled, a printed circuit board (4) located at a lower portion of the stator block (3), and a motor cover (5) coupled to the stator block (3);

a flange (200) comprising a flange body (201) having a hole in the center into which the motor assembly (100) is inserted, an upper protrusion (202) having an annular shape protruding upwardly along a periphery of the hole into which the motor assembly (100) is inserted, a damper seating part (203) formed in the shape of a groove on an inner side of the hole of the flange body (201), and a plurality of coupling protrusions (204) formed in the shape of protrusions on a lower portion of the flange body (201); and a damper plate (300) to seat the motor assembly (100) to the flange (200) comprising an annular body (301) having a ring shape, a plurality of locking parts (302) protruding upwardly from a periphery of the annular body (301) at regular intervals coupled to the coupling protrusions (204), and a plurality of protrusion guides (303) protruding toward the shaft (21) from a periphery of the annular body (301) at regular intervals, wherein the motor cover (5) comprises a cover part (50) and a packing part (51) enclosing a periphery of the cover part (50), wherein the cover part (50) having a cup shape in which an upper portion is open comprises a cover body (500); a connector coupling part (501) having a shape in which a portion of one side of the cover body (500) is open, to which a connector (41) is coupled; a rim part (502) having a shape extending outwardly along an upper edge of the cover body (500); a plurality of pairs of decoupling parts (503) protruding upwardly from a periphery of the rim part (502) at regular intervals; and a plurality of PCB coupling parts (504) formed in the shape of a groove on an inner side of an upper surface (502A) of the rim part (502) at regular intervals; and wherein the packing part (51) comprises a connector sealing part (511) formed around the connector coupling part (501); a water sealing part (512) formed on an upper surface (502A) of the rim part (502); a decoupling damper part (513) formed to enclose the pair of decoupling parts (503) protruding upwardly from an outer side of the rim part (502); a PCB support part (514) covering the PCB coupling part (54); and an air sealing part (515) formed to cover a side surface (502B) and a lower surface (502C) of the rim part (502) of the cover body (500).

2. The blower motor of claim 1, wherein the cover part (50) further comprises: a central protrusion (505) protruding upwardly from the center of an inner side of the cover body (500), and a central groove (506) formed by being indented upwardly from the center of an outer side of the cover body (500).

3. The blower motor of claim 1, wherein the water sealing part (512) seals the gap between the upper surface (502A) of the rim part (502) and the plate (30) of the stator block (3).

4. The blower motor of claim 1, wherein the decoupling damper part (513) is seated on the damper seating part (203) of the flange (200).

5. The blower motor of claim 1, wherein the air sealing part (515) is pressed against a protrusion guide (303) of the damper plate (300) supporting a portion between the decoupling parts (503).

* * * * *